US007177735B2

(12) United States Patent
Kurokawa

(10) Patent No.: US 7,177,735 B2
(45) Date of Patent: Feb. 13, 2007

(54) CONTROL APPARATUS FOR A HULL WITH A FOUR-CYCLE ENGINE INSTALLED THEREON

(75) Inventor: Toshiki Kurokawa, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 121 days.

(21) Appl. No.: 11/099,536

(22) Filed: Apr. 6, 2005

(65) Prior Publication Data

US 2006/0089762 A1 Apr. 27, 2006

(51) Int. Cl.
*G05D 1/00* (2006.01)

(52) U.S. Cl. ........................ 701/21; 114/256; 114/355; 114/102.1; D12/303

(58) Field of Classification Search .................. 701/21; 114/256, 355, 102.1; D12/303
See application file for complete search history.

(56) References Cited

U.S. PATENT DOCUMENTS

| | | | | |
|---|---|---|---|---|
| 3,103,197 | A * | 9/1963 | Von Schertel | 114/277 |
| 3,117,546 | A * | 1/1964 | Von Schertel | 114/277 |
| 4,068,607 | A * | 1/1978 | Harmon | 114/39.29 |
| 4,627,767 | A * | 12/1986 | Field et al. | 405/196 |
| 4,666,341 | A * | 5/1987 | Field et al. | 405/217 |
| 5,088,431 | A * | 2/1992 | Pizzey | 114/39.25 |
| 5,622,130 | A * | 4/1997 | Calderon et al. | 114/39.21 |
| 5,724,905 | A * | 3/1998 | Pizzey | 114/39.14 |
| 6,634,914 | B2 * | 10/2003 | Vancil | 441/40 |
| 6,662,738 | B2 * | 12/2003 | Estabrooks | 114/102.1 |
| 7,093,803 | B2 * | 8/2006 | Culp | 244/153 R |
| 2001/0046820 | A1 * | 11/2001 | Vancil | 441/40 |
| 2003/0000441 | A1 * | 1/2003 | Estabrooks | 114/102.16 |
| 2005/0127240 | A1 * | 6/2005 | Culp | 244/15 |
| 2006/0089762 | A1 * | 4/2006 | Kurokawa | 701/21 |

FOREIGN PATENT DOCUMENTS

| | | | |
|---|---|---|---|
| JP | 2000-335486 | | 12/2000 |
| JP | 20061117203 | A * | 5/2006 |

* cited by examiner

*Primary Examiner*—Cuong H. Nguyen
(74) *Attorney, Agent, or Firm*—Sughrue Mion, PLLC

(57) ABSTRACT

A control apparatus for a hull with a four-cycle engine installed thereon can perform engine stop processing by quickly detecting a turnover state of the hull while suppressing a turnover determination delay due to noise superposition. The apparatus includes a turnover determination part that determines, based on a detection signal from a turnover detection switch, whether the hull is in a turnover state, and an engine stop part that stops the engine upon determination of a final hull turnover state. The turnover determination part increments a detection ratio counter each time a detection signal indicative of a hull turnover state is input thereto, counts up a continuous turnover counter each time the detection ratio counter value indicates a predetermined determination ratio value or above. When the continuous turnover counter value reaches the predetermined determination value or above, the turnover determination part determines that the hull is in the final turnover state.

3 Claims, 8 Drawing Sheets

CONTROL APPARATUS FOR A HULL WITH A FOUR-CYCLE ENGINE INSTALLED THEREON

BACKGROUND OF THE INVENTION

1. Field of the Invention

The present invention relates to a control apparatus for a hull with a four-cycle engine installed thereon, and more particularly, to a new technique for stopping the engine when the hull is turned over.

2. Description of the Related Art

A known control apparatus for a hull with a four-cycle engine installed thereon uses a turnover detection switch of a pendulum type mounted on the hull of a marine vessel or ship, and a detection counter adapted to respond to the turnover detection switch, and continuously determines the count value of the detection counter for a fixed time, so that at the time when it is detected that the turnover detection switch has continuously been in a turnover state for a preset time, a determination is made that the hull of the ship is in a turnover state (see, for instance, a first patent document: Japanese patent application laid-open No. 2000-335486).

That is, in the known apparatus as described in the first patent document, the detection counter is incremented each time the turnover detection switch detects a turnover of the hull, and the detection counter is cleared to zero each time the normal state of the hull is detected, and the value of the detection counter reaches a predetermined value or above, the engine is caused to stop.

In the known control apparatus for the hull with the four-cycle engine installed thereon, there has been the following problem. That is, when the output of the turnover detection switch is momentarily changed into a normal side due to noise or the like, the detection counter is cleared in spite of the fact that the hull has been turned over, so the detection of the turnover state is determined as not having continued for the fixed time, and hence the detection counter is counted up again at that time, as a result of which a delay occurs in the detection of the turnover, thus giving rise to the possibility that the timing to stop the engine is accordingly delayed.

SUMMARY OF THE INVENTION

The present invention is intended to solve the problem as referred to above, and has for its object to obtain a control apparatus for a hull with a four-cycle engine installed thereon, which is capable of quickly determining a final turnover state of the hull while suppressing a delay in the determination of the turnover state due to noise or the like to a minimum, so that safety can be ensured by performing engine stop processing so as to avoid the runaway of the hull.

A control apparatus for a hull with a four-cycle engine installed thereon according to the present invention includes a turnover detection switch mounted on the hull on which the four-cycle engine is installed, for detecting a turnover state of the hull; a turnover determination part that determines, based on a detection signal from the turnover detection switch, whether the hull is in a turnover state; and an engine stop part that stops the four-cycle engine when the turnover determination part determines a final turnover state of the hull. The turnover determination part has a ratio determination processing section, a detection counter processing section, and a turnover determination processing section. The ratio determination processing section has a detection ratio counter, and increments the detection ratio counter each time a detection signal indicative of the turnover state of the hull is input thereto. The detection counter processing section has a continuous turnover counter, and counts up the continuous turnover counter each time the value of the detection ratio counter indicates a value equal to or greater than a predetermined determination ratio value. The turnover determination processing section determines that the hull is in the final turnover state when the value of the continuous turnover counter reaches a value equal to or greater than a predetermined determination value.

According to the present invention, it is possible to stop the engine by quickly detecting the final turnover state of the hull while suppressing a delay in the determination of the turnover state due to the superposition of noise or the like to a minimum, whereby the runaway of the hull, etc., can be avoided, thus making it possible to secure safety.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Hereinafter, a preferred embodiment of the present invention will be described in detail while referring to the accompanying drawings.

Embodiment 1

Figure 1:
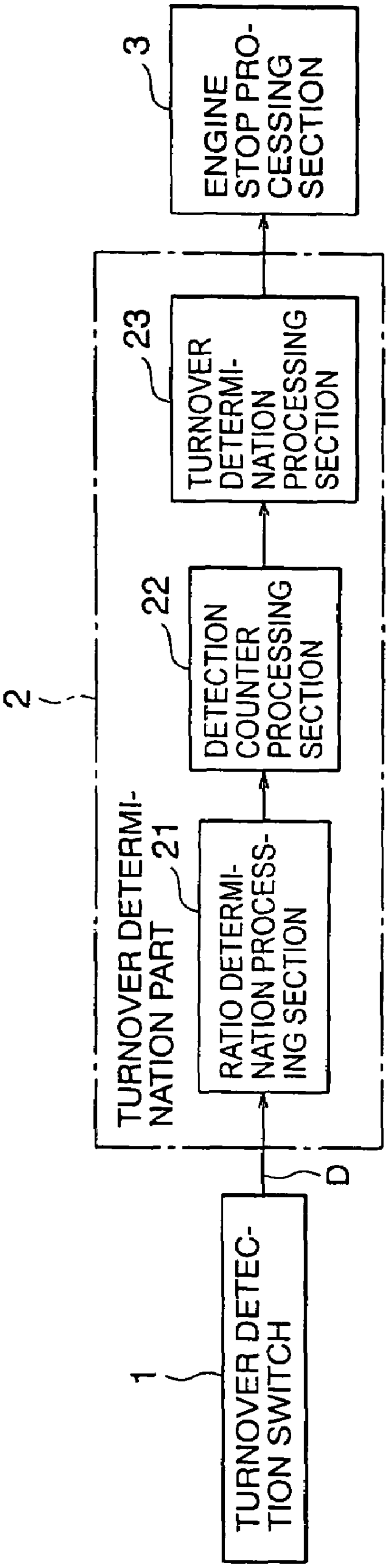
FIG. 1 is a block diagram showing a control apparatus for a hull with a four-cycle engine installed thereon according to a first embodiment of the present invention.

FIG. 1 is a block diagram that shows a control apparatus for a hull with a four-cycle engine installed thereon according to a first embodiment of the present invention.

In FIG. 1, the control apparatus for a hull with a four-cycle engine installed thereon is provided with a turnover detection switch 1, a turnover determination part 2, and an engine stop processing section 3. The turnover detection switch 1 is of a pendulum structure as described in the aforementioned first patent document, and is mounted on a central portion of the hull of a marine vessel or ship (not shown) with a four-cycle engine installed thereon for detecting the turnover state of the hull. The turnover determination part 2 has a ratio determination processing section 21, a detection counter processing section 22 and a turnover determination processing section 23. The engine stop processing section 3 constitutes an engine stop part, and serves to stop the four-cycle engine when the turnover determination part 2 determines that the hull is in its final turnover state.

In the turnover determination part 2, the ratio determination processing section 21 has a detection ratio counter (to be described later), and takes in a detection signal D from the turnover detection switch 1, so that it increments the detection ratio counter (i.e., counts up the counter by "1") each time the detection signal D is input thereto.

The detection counter processing section 22 in the turnover determination part 2 has a continuous turnover counter (to be described later), and counts up the value C2 of the continuous turnover counter by a predetermined value α each time the value C2 of the detection ratio counter indicates a value equal to or greater than a predetermined determination ratio value γ [%].

In addition, when the detection ratio counter value C1 indicates a value less than the determination ratio value γ [%], the detection counter processing section 22 stops the count processing of the continuous turnover counter. The detection counter processing section 22 counts down the continuous turnover counter value C2 by a predetermined value β only when the state that the detection ratio counter value C1 indicates a value less than the determination ratio value γ [%] occurs successively two times.

The turnover determination processing section 23 determines, based on the detection signal D from the turnover detection switch 1, whether the hull is in the turnover state. Specifically, when the continuous turnover counter value C2 reaches a value equal to or greater than a predetermined determination value δ, the turnover determination processing section 23 determines that the hull is in the final turnover state, and sets a turnover determination flag F indicative of abnormality to "1". On the other hand, when the continuous turnover counter value C2 is less than the determination value δ, the turnover determination processing section 23 clears the turnover determination flag F to "0".

Next, reference will be made to the respective procedures of the ratio determination processing section 21, the detection counter processing section 22, the turnover determination processing section 23 and the engine stop processing section 3 while referring to flow charts of FIG. 2 through FIG. 5.

Figure 2:
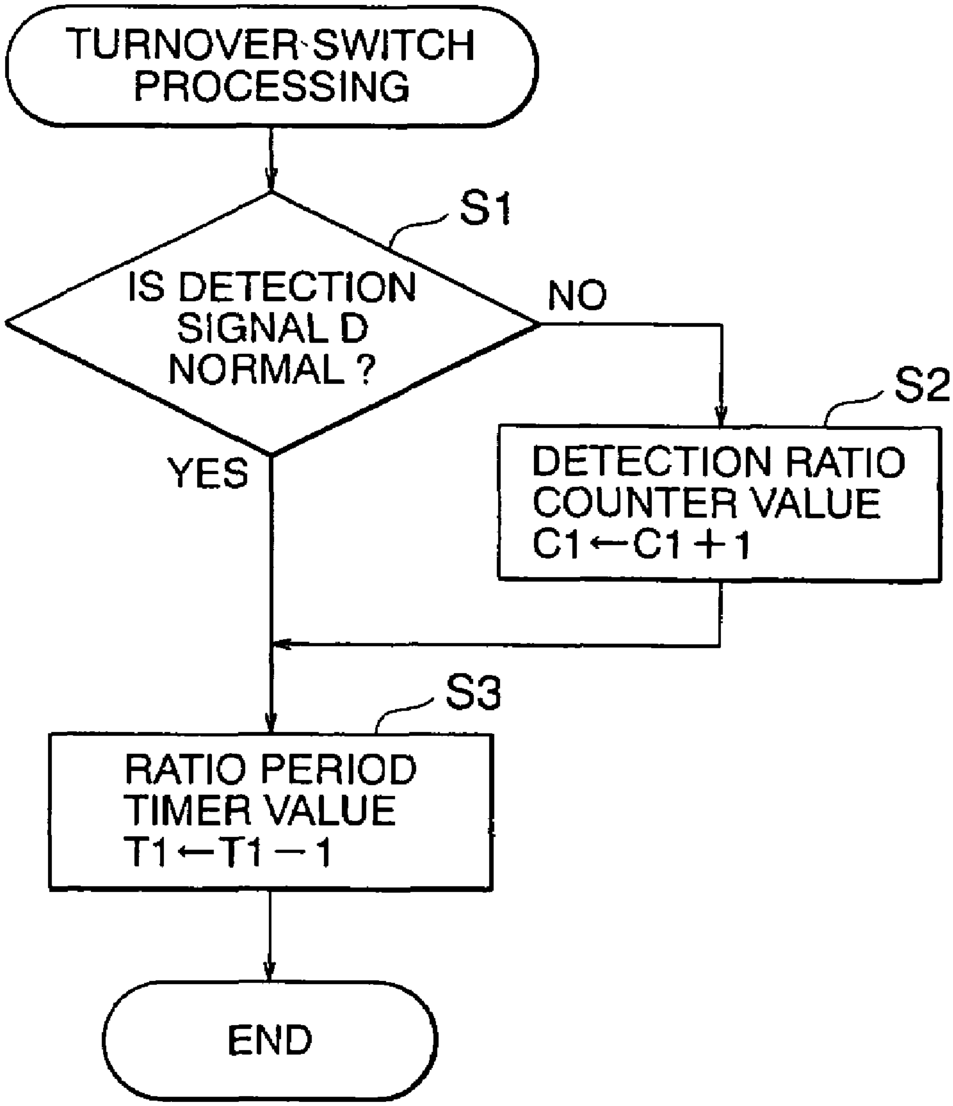
FIG. 2 is a flow chart illustrating the processing procedure of a turnover detection switch according to the first embodiment of the present invention.

First of all, the ratio determination processing section 21 in the turnover determination part 2 executes a turnover switching processing routine illustrated in FIG. 2. In FIG. 2, it is first determined whether the detection signal D from the turnover detection switch 1 indicates a normal state (i.e., turnover state) (step S1). In step S1, when it is determined that the detection signal D indicates a turnover (abnormal) state (that is, NO), the detection ratio counter is incremented (i.e., counted up by "1") (step S2).

On the other hand, when it is determined in step S1 that the detection signal D indicates a normal state (that is, YES), the processing in step S2 is not performed, and the value T1 of a ratio period timer is decremented (i.e., counted down by "1") (step S3), and the turnover switch processing routine of FIG. 2 is terminated. Here, note that the ratio period timer comprises a down timer, and the processing of measuring the elapse of a predetermined time is achieved by a down counting operation of the timer.

Figure 3:
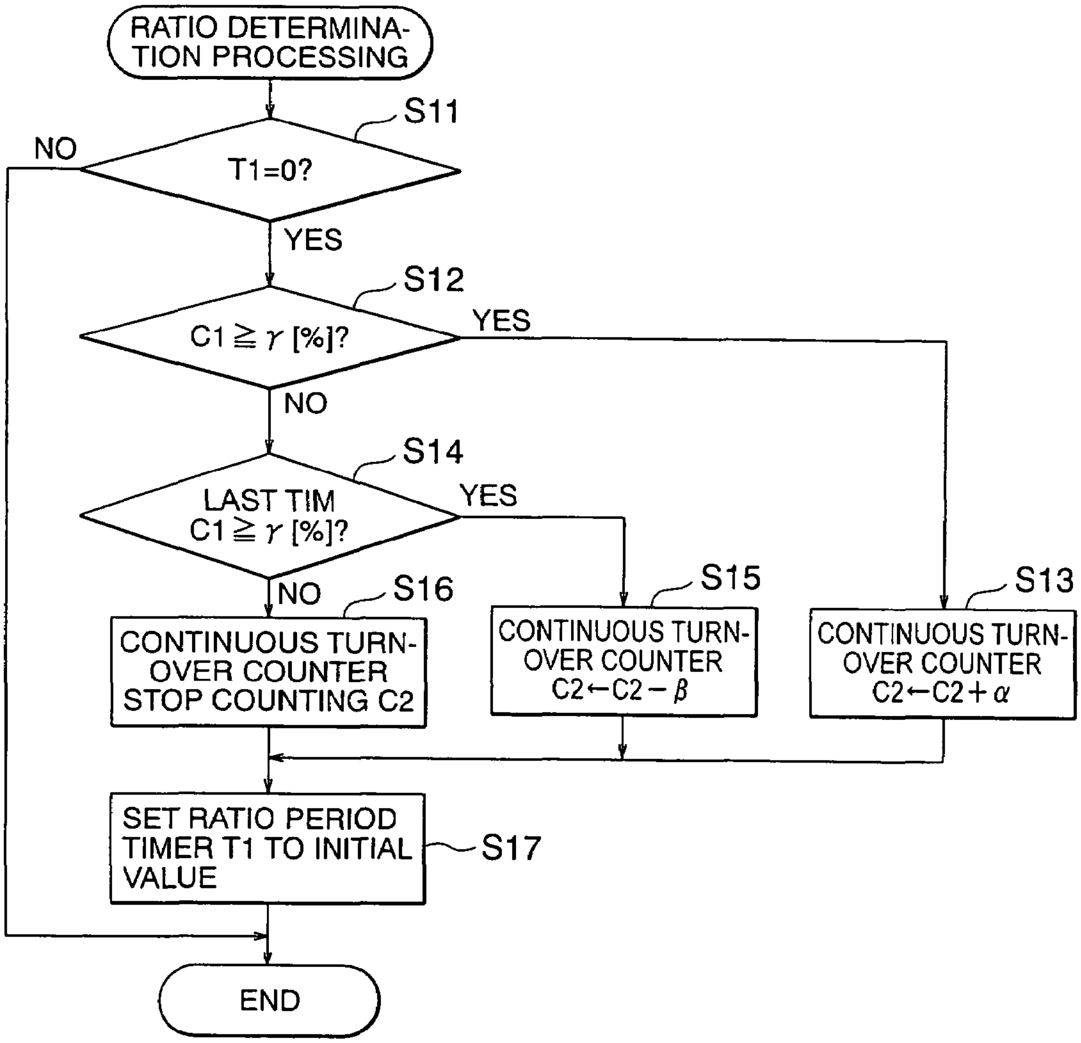
FIG. 3 is a flow chart illustrating a determination procedure for a turnover detection ratio according to the first embodiment of the present invention.

Then, the detection counter processing section 22 in the turnover determination part 2 executes a ratio determination processing routine illustrated in FIG. 3. In FIG. 3, it is first determined whether the ratio frequency timer value T1 has been counted down to "0" (step S11), and when determined as T1>0 (that is, NO), the processing routine of FIG. 3 is terminated without performing any processing. That is, the ratio determination processing routine of FIG. 3 is executed only when T1=0 (the predetermined time has elapsed).

On the other hand, when it is determined as T1=0 in step S11 as a result of the predetermined time having elapsed (that is, YES), it is further determined whether the detection ratio counter value C1 has reached the determination ratio value γ [%] or above by making a comparison between the detection ratio counter value C1 calculated within the predetermined time and the determination ratio value γ [%] (step S12).

When it is determined as C1≧γ [%] in step S12 (that is, YES), the continuous turnover counter value C2 is counted up by the predetermined value α (step S13), and the control flow proceeds to step S17, whereas when determined as C1<γ [%] in step S12 (that is, NO), it is subsequently determined whether the last detection ratio counter value C1 is less than γ [%] (C1<γ [%]) (step S14).

When it is determined in step S14 that the last value C1 is also less than <γ [%] (successively two times) (that is, YES), the continuous turnover counter value C2 is counted down by the predetermined value β (step S15), and the control flow proceeds to step S17.

On the other hand, when it is determined as C1≧γ [%] at the last time in step S14 (that is, NO), the count processing of the continuous turnover counter value C2 is stopped (step S16), and the control flow proceeds to step S17. In other words, when C1≧γ [%] at the last time and C1<γ [%] at the current time, the continuous turnover counter value is held unchanged or in a state as it is.

Thus, if the count processing of the continuous turnover counter based on the result of the determinations of the detection ratio counter is executed in steps S12 through S16, the value T1 of the ratio period timer is finally set again to the initial value (step S17), and the control flow shifts to the following fixed time period calculation processing after terminating the ratio determination processing routine of FIG. 3.

Subsequently, the turnover determination processing section 23 in the turnover determination part 2 executes a turnover determination processing routine illustrated in FIG. 4.

Figure 4:
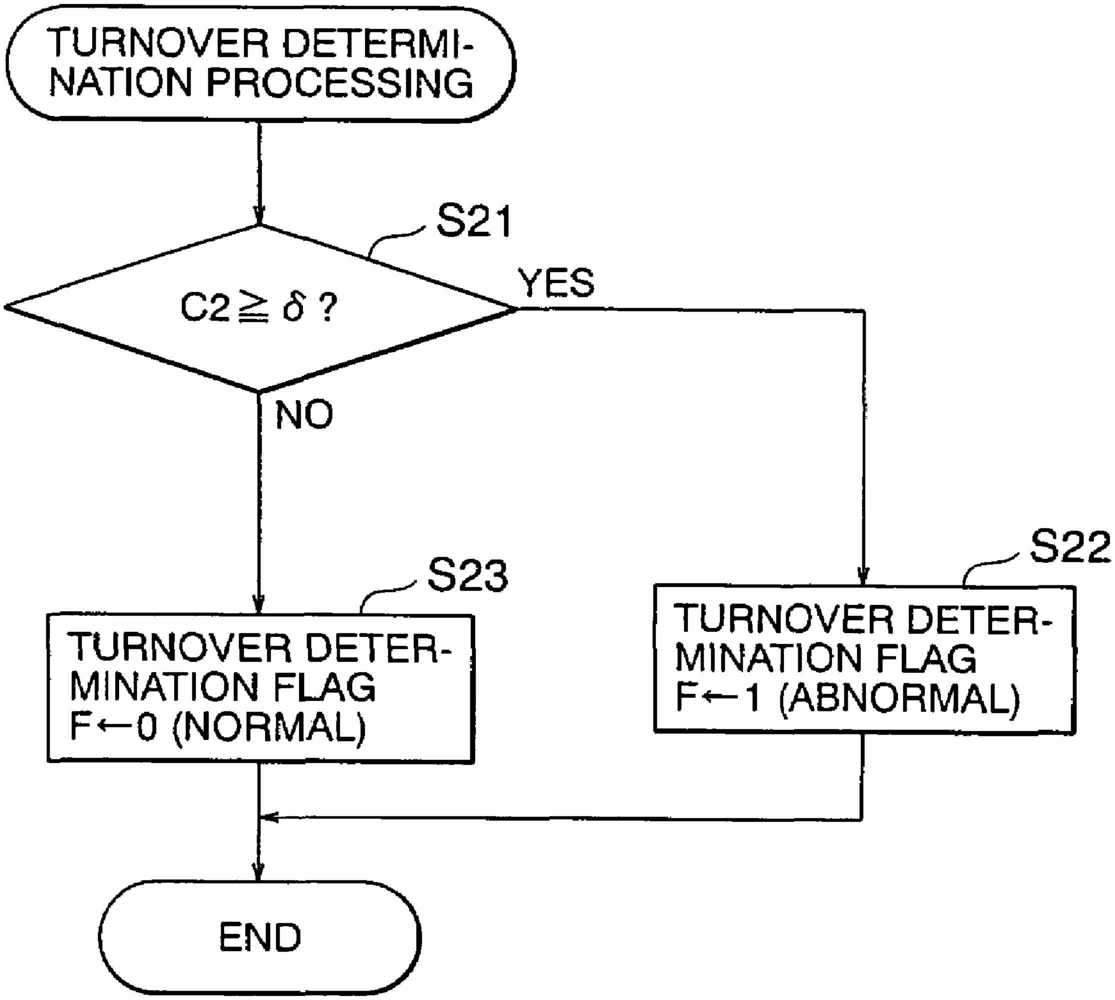
FIG. 4 is a flow chart illustrating a turnover determination procedure according to the first embodiment of the present invention.

In FIG. 4, first of all, it is determined whether the continuous turnover counter value C2 set in the ratio determination processing routine (FIG. 3) is equal to or more than the predetermined determination value δ (predetermined number of times) (step S21).

When it is determined as C2≧δ in step S21 (that is, YES), it is assumed that the hull is in the final turnover state (final abnormal state), so the turnover determination flag F is set to "1" (step S22), and the turnover determination processing routine of FIG. 4 is terminated. On the other hand, when determined as C2<δ in step S21 (that is, NO), it is assumed that the hull is in the normal state, so the turnover determination flag F is set to "0" step S23), and the turnover determination processing routine of FIG. 4 is terminated.

Figure 5:
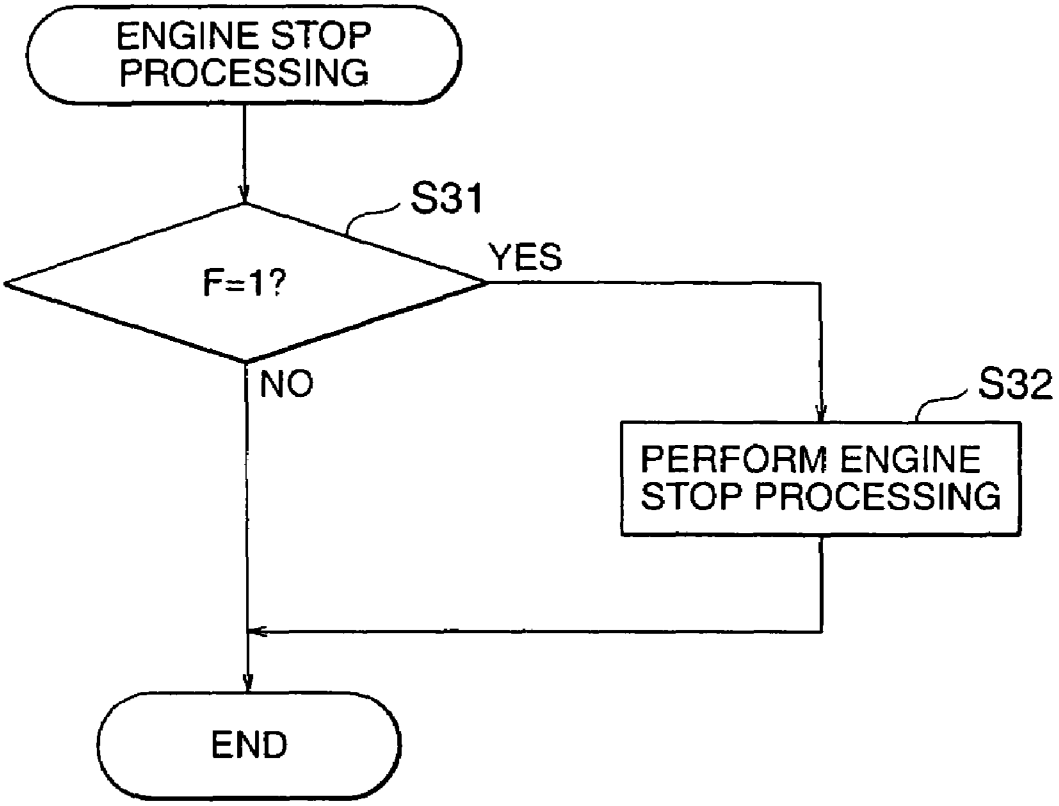
FIG. 5 is a flow chart illustrating an engine stop processing procedure upon determination of a turnover of the hull according to the first embodiment of the present invention.

Finally, the engine stop processing section 3 executes an engine stop processing routine illustrated in FIG. 5. In FIG.

5, first of all, it is determined whether the turnover determination flag F has been set to "1" (step S31), and when determined as F=1 (that is, YES), it is indicated that the hull is in the final turnover state, so ignition is cut off to stop the engine (step S32), and the engine stop processing routine of FIG. 5 is terminated.

On the other hand, when it is determined as F=0 in the step S31 (that is, NO), it is indicated that the hull is in the normal state, and hence the engine stop processing routine of FIG. 5 is terminated without executing the step S32. As a result, when determined that the hull is in the normal state, ignition is not cut, permitting the engine to rotate.

Figure 6:
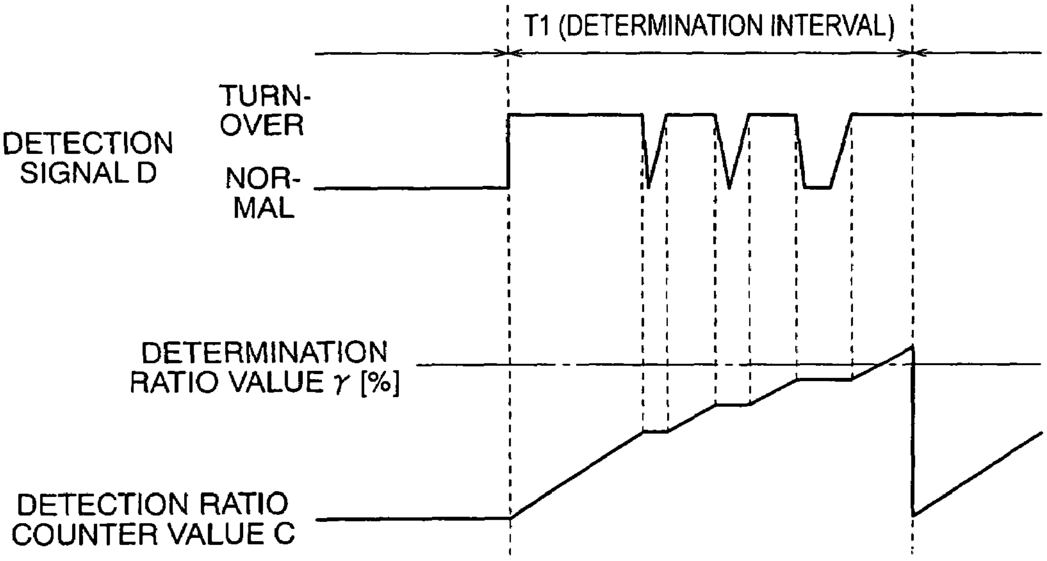
FIG. 6 is a timing chart illustrating ratio determination processing between the value of a detection ratio counter within a fixed time and the value of a determination ratio according to the first embodiment of the present invention.
Figures 7A, 7B:
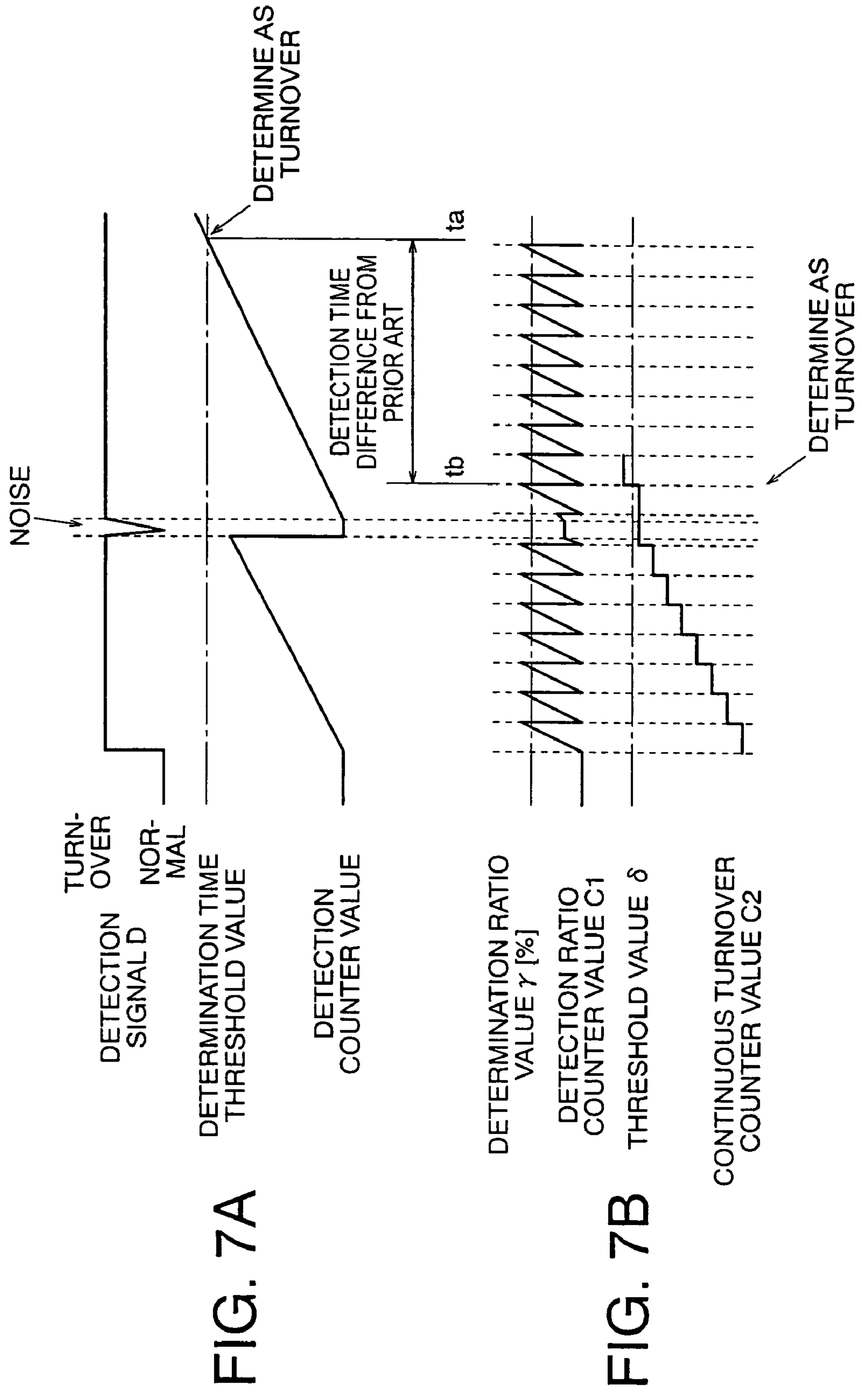
FIG. 7 is a timing chart illustrating a time difference in the detection determination processing according to the first embodiment of the present invention in comparison with conventional processing.
Figure 8:
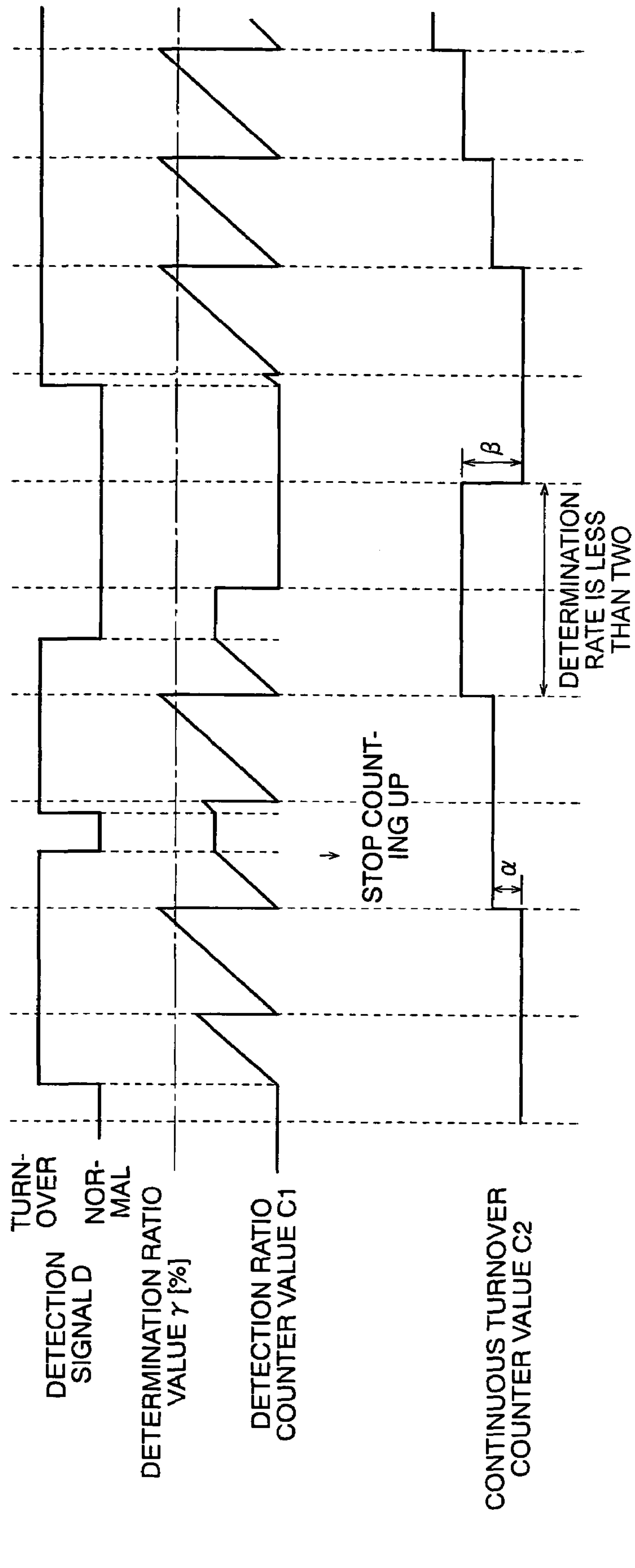
FIG. 8 is a timing chart illustrating a change in the value of a continuous turnover counter according to the result of a comparison between the detection ratio counter value and the determination ratio value.

FIG. 6 through FIG. 8 are timing charts that illustrate respective parameters and the changes of states over time according to the above processing operations. FIG. 6 is a timing chart that illustrates the changes of states in the turnover switch processing (see FIG. 2), wherein a relation between the detection ratio counter value C1 for the detection signal D within the predetermined time T1 and the determination ratio value γ [%] is represented. FIGS. 7A and 7B are timing charts that illustrate the changes of states in the turnover determination processing (see FIG. 4), wherein a time difference (ta−tb) of the final turnover determination timing between conventional processing (FIG. 7A) and processing (FIG. 7B) according to the first embodiment of the present invention is represented in comparison with each other. FIG. 8 is a timing chart that illustrates the changes of states in the ratio determination processing (see FIG. 3), wherein a change in the continuous turnover counter value C2 is represented according to the result of a comparison between the detection ratio counter value C1 and the determination ratio value γ [%].

In FIG. 6, the detection ratio counter value C1 is counted up only when it is determined that the detection signal D indicates the turnover state of the hull within the fixed time T1 (step S2 in FIG. 2), and it is not counted up so as to be held unchanged or in a state as it is when determined that the detection signal D indicates the normal state of the hull because of noise or the like within the fixed time T1. Here is illustrated an example in which the detection ratio counter value C1 has reached the determination ratio value γ [%] or above within the fixed time T1.

In FIGS. 7A and 7B, there is shown a detection difference (time difference) between the turnover determination operation (FIG. 7A) according to conventional processing and the final turnover determination (FIG. 7B) in the turnover determination operation according to the first embodiment of the present invention. In addition, herein is illustrated the operation of processing in the case where noise is superposed on the detection signal D during the time from a time point when the turnover detection switch 1 outputs the detection signal D indicative of the turnover state of the hull to a time point when the final turnover state of the hull is determined.

In FIG. 7A, it is found that according to the conventional processing, when the detection counter value is reset due to noise superposition by the time the detection counter value becomes equal to or greater than the determination time threshold value, a lot of time is required until the time (i.e., at time point ta) the detection counter value is thereafter counted up again to reach the determination time threshold value or above.

On the other hand, in FIG. 7B, according to the processing of the first embodiment of the present invention, the continuous turnover counter value C2 is held unchanged (i.e., at the last value) because of C1<γ [%] at determination timing upon noise superposition, and subsequently counted up again when C1 becomes equal to or greater than γ [%] (i.e., C1≧γ [%]) at the following determination timing. Thereafter, at a time point tb at which the continuous turnover counter value C2 has reached the determination value δ or above, it is determined that the hull is in the final turnover state. Herein is shown the case where even if noise superposition occurs immediately before the continuous turnover counter value C2 reaches the determination value δ, it is determined immediately thereafter (at time point tb) that the hull is in the final turnover state.

As described above, the turnover detection switch 1 is mounted on the hull with the four-cycle engine installed thereon, and the turnover determination part 2 and the engine stop processing section 3 are also provided so that the engine can be stopped by counting up the continuous turnover counter value C2 when the detection ratio counter value C1 reaches the determination ratio value γ [%] or above, and by determining that the hull is in the final turnover state when the continuous turnover counter value C2 reaches the determination value δ or above.

In addition, even in case where the detection signal D of the turnover detection switch 1 becomes to indicate the normal state of the hull due to noise superposition or the like even momentarily (see FIG. 7B), it is possible to perform normal determination processing without receiving the influence of noise superposition to any substantial extent when the detection ratio counter value C1 corresponding to the following detection signal D indicates the determination ratio value γ [%] or above.

That is, by adopting a double determination method for the detection ratio counter value C1 and the continuous turnover counter value C2, it is possible to determine the final turnover state of the hull after a minimum determination delay time even if an incorrect or faulty determination occurred due to noise superposition or the like. Accordingly, the final turnover state of the hull can be quickly detected while suppressing a delay in the determination of the turnover state due to the superposition of noise or the like to a minimum, whereby the runaway of the hull, etc., can be avoided, thus making it possible to secure safety.

In addition, the detection ratio counter value C1 is counted up each time the detection signal D of the turnover detection switch 1 indicates the turnover state of the hull, and the continuous turnover counter value C2 is counted up by the predetermined value a when the detection ratio counter value C1 reaches the determination ratio value γ [%], but the count processing thereof is stopped when the detection ratio counter value C1 has not reached the determination ratio value γ [%]. In other words, even when C1 becomes less than γ [%] (i.e., C1<γ [%]), the continuous turnover counter value C2 is not cleared to zero but its count processing is instead stopped only once, whereby the determination delay of the final turnover state can be suppressed to a minimum.

Moreover, the continuous turnover counter value C2 is counted down by the predetermined value β only when the state that the detection ratio counter value C1 does not reach the determination ratio value γ [%] occurs successively two times. That is, even if the detection ratio counter value C1 within the predetermined time T1 does not reach the determination ratio value γ [%], as shown in FIG. 3 (FIG. 8), the count-down processing of the continuous turnover counter value C2 is stopped when the determination of C1<γ [%] is the first time, and the continuous turnover counter value C2 is counted down by the predetermined value β when the determination of C1<γ [%] continues two times, as a result of which it is possible to avoid incorrect or faulty determination such as the tilt or inclination of the hull during turning or cornering being determined as the turnover state thereof, thereby preventing unnecessary engine stop processing.

While the invention has been described in terms of a preferred embodiment, those skilled in the art will recognize that the invention can be practiced with modifications within the spirit and scope of the appended claims.

What is claimed is:

1. A control apparatus for a hull with a four-cycle engine installed thereon, said apparatus comprising:

a turnover detection switch mounted on said hull on which said four-cycle engine is installed, for detecting a turnover state of said hull;

a turnover determination part that determines, based on a detection signal from said turnover detection switch, whether said hull is in a turnover state; and an engine stop part that stops said four-cycle engine when said turnover determination part determines a final turnover state of said hull;

wherein said turnover determination part has a ratio determination processing section, a detection counter processing section, and a turnover determination processing section;

said ratio determination processing section has a detection ratio counter, and increments said detection ratio counter each time a detection signal indicative of the turnover state of said hull is input thereto;

said detection counter processing section has a continuous turnover counter, and counts up said continuous turnover counter each time the value of said detection ratio counter indicates a value equal to or greater than a predetermined determination ratio value; and said turnover determination processing section determines that said hull is in the final turnover state when the value of said continuous turnover counter reaches a value equal to or greater than a predetermined determination value.

2. The control apparatus for a hull with a four-cycle engine installed thereon as set forth in claim 1, wherein said detection counter processing section counts up said continuous turnover counter by a predetermined value when the value of said detection ratio counter indicates said determination ratio value or above; and said detection counter processing section stops the count processing of said continuous turnover counter when the value of said detection ratio counter indicates a value less than said determination ratio value.

3. The control apparatus for a hull with a four-cycle engine installed thereon as set forth in claim 1, wherein said detection counter processing section counts down said continuous turnover counter by a predetermined value only when the state that the value of said detection ratio counter indicates a value less than said determination ratio value occurs successively two times.

* * * * *